United States Patent Office 3,107,427
Patented Oct. 22, 1963

3,107,427
FILLING OF DENTAL CAVITIES AND FASTENING SUBSTITUTE TOOTH MEMBERS WITH ADMIXTURE OF A POLYETHYLENEIMINE COMPOUND AND AN ALKYL OR ARYL SULFONIC ACID ESTER
Werner Schmitt and Robert Purrmann, Starnberg, and Peter Jochum, Steinebach, Worthsee, Germany, assignors to Espe Fabrik Pharmazeutischer Praparate G.m.b.H., Seefeld, Upper Bavaria, Germany
No Drawing. Filed May 21, 1959, Ser. No. 814,681
Claims priority, application Germany June 6, 1958
25 Claims. (Cl. 32—15)

This invention relates to dental filling materials and it has particular relation to compositions or materials suitable for filling dental cavities and for fixing dental inlays, crowns, bridges and like dental work.

For these purposes, primarily inorganic cements, containing in most cases phosphoric acid, have been hitherto used (see German Patent No. 870,470). These known cements have a series of disadvantages. They are often porous and, therefore, not capable of preventing penetration of bacteria into cavities and secondary caries resulting therefrom. Furthermore the phosphoric acid applied in their use often causes damage of the soft fleshy part of the tooth "Pulpa" and the gums. Moreover, the inorganic cements are not entirely insoluble in water and are, therefore washed out gradually. Another disadvantage is the limited adhesive power of these materials relative to dentine and their relatively high brittleness. Due to the latter, they are often not capable of meeting the mechanical requirements in the mouth and are not sufficiently resistant to the chewing pressure particularly at exposed spots, e.g. edges and corners. Finally, during hardening or setting of these materials or compositions in the mouth, elaborate precautions are necessary for preventing their contact with saliva during several minutes.

It has been suggested previously (see German Patent No. 760,357 and the periodical "Zahnaerztliche Welt" 1951, pages 7–14, and 1954, pp. 632–635) to use mixtures hardenable by polymerization, particularly mixtures of polymethacrylates and polymerizable monomeric substances, such as derivatives of methacrylic acids, for filling dental cavities. Particularly, methyl methacrylate has been used in the form of a mixture of the monomer and polymer, in dental practice. These masses have, however, the considerabde disadvantage that, as a rule, the "pulpa" were injured or caused to die by the residual monomers. Further decisive disadvantages are that the methacrylate fillings are lacking in fastness of color and, due to the effect of light, exhibit distinct decolorations already after a few months, and also show considerable shrinkage during polymerization, which resutls in the formation of gaps between the body of the teeth and the filling material.

It has now been found that these disadvantages can be eliminated by the use of organic polyethylene-imine compounds which are capable of cross-linking and have, on an average, up to 20 ethylene-imine groups. Such polyethylene imine compounds are, for example, the addition product of $\alpha,\beta$-ethylene-imine or its C-alkyl derivatives (alkyl substituted $\alpha,\beta$-ethyleneimines) with an organic compound having at least two reactive carbon double bonds or the reaction product of $\alpha,\beta$-ethylene imine or its C-alkyl derivatives with polyepihalogen hydrine (prepared, for example, according to U.S. Patent 2,483,749). The ethylene imine derivatives used according to the present invention are, as a rule, masses which are liquid to plastic at ordinary room temperatures of e.g. 15°–25° C., which can be easily adjusted to products of any desired consistency by mixing products of different degrees of polymerization. Compounds having per molecule, in the average, 2–10, preferably 3–7, ethylene imine groups, have been found to have the most favorable characteristics. Solid polyethylene imine compounds can be likewise included in the masses embodying the present invention, by admixing them, as by dissolving or suspending in a suitable solvent such as an organic liquid, particularly a liquid ethylene imine compound such as a monoethylene imine derivative. By the addition of one or more alkylating, or acid, cross-linking agents, the polyethylene imine compounds are converted into hard, insoluble products.

The preparation of addition products of ethylene imine and organic compounds having reactive double bonds, has been known previously and their use as artificial material either alone or together with other polymerizable compounds was also known. However it was unexpected and by no means obvious to a person skilled in the art that in the compositions of the present invention such addition products capable of cross-linking and other polyethylene imine compounds, can meet the particularly severe and specific conditions which are required from products for filling dental cavities and for fastening dental substitute parts. These requirements which are met according to the present invention, are as follows:

(1) The products must be able to meet the particularly high requirements in connection with the chemical and mechanical stresses in the mouth. It is surprising that substances which contain a plurality of imino groups and are, therefore, of hydrophil character, are not washed out by the saliva.

(2) The products must be physiologically harmless, i.e. they should not attack the gums and the fleshy part of the tooth ("Pulpa"). It is amazing that this condition is also met, because this could not be expected in view of the presence of the rather reactive ethylene-imino groups.

(3) The hardening or curing process must take place so quickly that it is completed when the treatment by the dentist is finished. This is exactly the requirement which has hitherto prevented in practice the use of synthetic plastics for the purposes of the present invention. Merely in the case of methyl methacrylate masses which—as mentioned above—cannot be used in dental practice for other reasons, was it possible to reduce the curing process by particular steps to a somewhat acceptable period of time. However, in order to attain this, complicated and often instable Redox-catalyst systems were necessary.

Surprisingly, the compositions of the present invention fully meet this requirement of the practice. Upon the addition of cross-linking agents they are converted at ordinary room temperature into hard and completely insoluble materials, within few minutes. It is likewise entirely unexpected that this applies also to the particularly suitable addition products of ethylene imine with unsaturated polyesters having, on the average, 3 to 7 activated double bonds in the molecule, i.e. to products for which—in analogy to the unsaturated polyester resins—cross-linking could be expected, in view of their viscosity, only during longer periods of time or at higher temperatures.

Some of the ethylene imine polyesters which have particularly valuable characteristics, react with the conventional cross-linking agents, e.g. benzene sulfonic acid methylester, too slowly for the practical requirements of dental practice, whereby it has to be taken into consideration that the particularly fast acting cross-linking agent dimethyl sulfate cannot be used for physiological reasons. It has now been found that these polyethylene imine compounds harden, even at low temperatures, quickly enough with the aid of arylsulfonic acid methylesters, which are electro-negatively substituted in the nucleus.

In addition, in the use of compositions embodying the present invention, the other disadvantages occurring in connection with substances hitherto used for similar purposes in dental medicine, are likewise eliminated. The compositions of this invention are not porous, so that the danger of secondary caries is reduced; they do not contain monomers which may cause damage to the tissues and their shrinkage during polymerization is smaller than that of methyl-methacrylate.

Pure methylmethacrylate shows a shrinkage of 23.3% during polymerization, while the compositions of the invention show a shrinkage of 4–5%, depending on the specific composition, in the absence of fillers during polymerization.

Due to the multitude of reactive points in each molecule of the compounds of this invention, there is no danger that a part of the molecules will be not subjected to cross-linking and thus residual monomers could damage the "pulpa." The cross-linking agent likewise becomes a built-in element of the cross-linked material.

It is another advantage of this invention that by selecting the dosage of the cross-linking agent, the dentist can adjust any desired setting time. As the compositions of the invention are insensitive to saliva, in contrast to dental elements hitherto used, it is not necessary to keep off the saliva during the setting period and this is a considerable help for the dentists.

In set condition, the compositions of the invention show high transparency and in the presence of suitable fillers they cannot be distinguished from dental enamel so that fillings prepared with such compositions are cosmetically unobjectionable also in the front teeth area. Moreover, the fillings show complete fastness of color and this is a decisive advantage in comparison with methacrylate compositions. Discolorations could be observed neither in practical use, nor during radiation of samples with ultraviolet light.

It has been found that in compositions of the invention, the use of addition products of ethylene imine and polyesters from $\alpha,\beta$-unsaturated carboxylic acids and polyvalent (polyhydric) alcohols is very appropriate. Among these substances, in the use of $\alpha,\beta$-unsaturated dicarboxylic acids and diols (dihydric alcohols)—particularly diols, the OH-groups of which are not vicinal and particularly if the diols are branched—substances having especially favorable characteristics are obtained. Addition products of ethyleneimine with mixed condensation products from maleic acid and various diols, yield fillings having very good physical properties. Polyester derivatives having more than 2 ethyleneimino groups in the molecule, are more stable to saliva than products which are prepared from purely bifunctional ethyleneimine derivatives.

The polyesters may contain also unsaturated monocarboxylic acids, or at least in part, saturated mono- or dicarboxylic acids. Furthermore, the simultaneous use of monovalent (monohydric) alcohols is possible and this can be utilized for adjustment of the molecular weight. Suitable compounds can be obtained, for example, also from polyglycidcrotonate (prepared, for example, according to U.S. Patent No. 2,556,075) which is converted by addition with ethyleneimine into polyglycide-$\beta$-ethyleneimino-butyrate.

Prior to a further treatment or processing of the unsaturated polyesters, care should be taken that acid groups, if any such group is present, have to be neutralized with basic agents and for this purpose, preferably amines, e.g. triethylamine, and the like are suitable. The use of high-boiling or non-volatile or difficulty volatile tertiary amines is also satisfactory, as these products are odorless. As an example, the reaction product of polyepibromohydrine with dimethylamine is mentioned. Furthermore, the use of a small excess of such amines in the case of particularly reactive polyethyleneimine compounds can be utilized for slowing down the cross-linking to such an extent that the dentist has sufficient time for processing. If reaction products of polyepihalogenohydrine with $\alpha,\beta$-ethyleneimine, or its C-alkyl derivatives, are used according to the present invention, it is not necessary that all halogen atoms of the polyepihalogenohydrine are substituted by ethyleneimino groups. It is, for example, sufficient to replace on the average 60% of the halogen atoms by ethyleneimino radicals. The residual halogen atoms can be substituted by reaction, for example, with alkali alcoholates, by alkoxy- and/or aryloxy groups. In order to reduce solubility in water it is often of advantage to introduce hydrophobic radicals, in this manner. Such reaction products from polyepihalogenohydrines and ethyleneimine, harden in most cases slower than polyester derivatives. Therefore, their application is of interest in the first line in mixtures with quickly cross-linking substances.

As cross-linking agents for polyethyleneimine compounds quite generally alkylating agents or acids can be used. Particularly suitable are sulfonic acid methylesters, especially benzene sulfonic acid methylester and p-toluenesulfonic acid methylester. Slowly hardening ethyleneimine compounds—for example those containing strongly branched diols—can be likewise sufficiently quickly cross-linked by means of highly active cross-linking agents. Particularly active cross-linking agents are for example, sulfonic acid esters having electronegative substituents in the benzene nucleus, such as 2,5-dichloro- or 4-nitro-benzene sulfonic acid methylester. If these cross-linking agents are solid, they should be preferably dissolved in a liquid cross-linking agent. By mixing various cross-linking agents, practically any desired setting time can be adjusted. On the other hand by mixing various polyethyleneimine compounds, almost any desired viscosity can be adjusted.

The cross-linking agent is added in a proportion of 0.5 to 10% by weight, preferably 2 to 8% by weight. Higher amounts have, as a rule, an adverse effect on the final hardness.

In practice, the polyethyleneimine compound and the cross-linking agent are separately stored and delivered and the substances are, as a rule, mixed with each other just before use.

Another possibility of modifying the characteristics of compositions embodying the present invention, consists in that filling agents such as quartz powder, barite and the like, as well as pigments, or coloring agents and, if desired, disinfecting agents are incorporated therein.

The polyethyleneimine compounds, especially the particularly suitable addition products of ethyleneimine and polyesters of $\alpha,\beta$-unsaturated dicarboxylic acids and diols, are in most cases viscous substances which are more or less sticky. In order to eliminate this characteristic which is undesirable in processing by the dentist, the incorporation of suitable fillers is likewise of advantage. Examples of such fillers are talcum, asbestos fibers and the like. However, these substances have the disadvantage that they affect the transparency of the compositions in set condition and this is undesirable from the cosmetic point of view, particularly in filling located in the frontal area of the mouth.

It has now been unexpectedly found that the same effect—i.e. the obtaining of a consistency at which the compositions can be conveniently shaped by the dentist—can be attained without any reduction of transparency by incorporation of organic filling materials. As such filling materials, first of all artificial resins, such as polymerization products of unsaturated organic compounds can be used. Suitable materials are, for example, acrylic resins, methacrylic resins and particularly the acetals of polyvinyl alcohol, especially polyvinyl-formal (polyvinyl-alcohol-formaldehydeacetal). Moreover, the incorporation of such organic filling materials often results in distinct improvement of the mechanical properties.

The following examples describe some specific embodiments of and best modes for carrying out the invention, to which the invention is not limited.

As already mentioned above, the compositions according to the present invention should not have an acid reaction. Therefore, it is not particularly mentioned in the following examples if the compositions have been treated with basic organic compounds in order to neutralize acid groups, if any, present in the compositions.

*Example 1*

1.0 gram of a product obtained by addition reaction from α,β-ethyleneimine with a polyester prepared from maleic acid anhydride and butane diol-1,3 in the proportion of 4 mols of maleic acid anhydride to 5 mols of butane diol-1,3 according to the process described in Deutsch Auslegeschrift 1,020,790, are mixed with a spatula at ordinary room temperature with 40 milligrams of p-toluenesulfonic acid methylester. The resulting paste is used for fastening crowns and inlays. After about 4 minutes the paste changes to a gel-like consistency and shortly after, e.g. in about 7 minutes, it is completely hardened.

*Example 2*

The 1.0 gram of ethyleneimino-polyester described in the above Example 1 is stirred into a paste with 40 milligrams of benzene sulfonic acid methylester. The setting starts after about 1½ minutes and a hard and insoluble product is formed in about 3 minutes.

*Example 3*

A polyester is prepared from maleic acid anhydride and 2-ethylhexanediol-1,3 by reacting them in a molecular proportion of 5:7 and the free carboxyl groups still present in the reaction product are neutralized by the addition of tributylamine in an excess of about 20%. Subsequently, an addition product is formed by addition reaction with α,β-ethyleneimine to 80% of the double bonds present.

0.5 gram of the product thus obtained are mixed with 40 mg. of a mixture consisting of benzene sulfonic acid methylester and 2,5-dichlorobenzenesulfonic acid methylester, in the proportion by weight of 3:1. Setting starts after about 1½ minutes and a hard product is formed in about 5 minutes. The mixture is very well suitable for fastening bridges and inlays.

*Example 4*

A product is prepared by incorporating 0.4 gram of powdered quartz and 0.2 gram of barite in 1.0 gram of the ethyleneimino polyester described in the above Example 1 and the resulting product is mixed with 2% by weight of benezenesulfonic acid methylester. The mixture is excellently suitable for permanent filling of tooth cavities. The setting starts after about 3 to 4 minutes.

*Example 5*

A polyester is prefared by reacting maleic acid anhydride, chinite, and 2-ethyl-hexanediol-1,3 in the molecular proportion of 3:1:3. After neutralization of the carboxyl groups still present, by means of poly-(dimethylaminomethylethyleneoxide), which is prefared by the reaction of polyepibromohydrine with dimethylamine, α,β-ethyleneimine is introduced by addition reaction to 95% of the double bonds. 1.0 gram of the product thus obtained is mixed with 0.1 gram of benzenesulfonic acid methylester. The mixture changes, after about 7 minutes to a gel-like condition and a complete hardening occurs then soon.

*Example 6*

A product is prepared by addition reaction from α,β-ethyleneimine with a polyester prepared from maleic acid anhydride, 3-methylpentanediol-2,4 and 3-methylheptanediol-1,2,4 in the molecular proportion of 3:1:3. This product is then mixed with 3% by weight of a mixture consisting of benzene sulfonic acid methylester and 3-nitrobenzene sulfonic acid methylester in the proportion of 3:1. The setting starts after about 3 minutes and subsequently the mixture soon changes to a hard transparent mass.

*Example 7*

A polyester is prepared from maleic acid anhydride, phthalic acid anhydride and butanediol-1,3, in the molecular proportion of 7:1:10. After neutralization of the carboxyl groups and an addition reaction with α,β-ethyleneimine, a product is formed in which 60% by weight of barite, 20% by weight of powdered quartz and 20% by weight of talcum are incorporated. The viscous mass thus obtained is converted by mixing it with 2 and 10% benzenesulfonic acid methylester, within a few minutes, into a hard substance which is well suitable for permanent fillings.

*Example 8*

22 grams of polyepibromohydrine having a polymerization degree of 6 are dissolved in 50 grams of methylglycol and heated with 28 grams of ethyleneimine and 22 grams of potassiumcarbonate with stirring, for an hour to 50° C. and one hour to 60° C. After the addition of 5.4 grams of sodiummethylate the product is further heated under stirring to 60° C. for 22 hours. The reaction mixture is taken up in 300 ml. of benzene, the liquid is separated by suction and the filtered liquid is concentrated as far as possible under vacuum. The resulting product is taken up again in benzene, separated from undissolved material by centrifuging and the solvent is removed again under vacuum. In the product thus obtained 60% of the side chains carry ethyleneimine radicals and 40% of the side chains carry methylether groups. This substance is converted by mixing it with 10% of benzenesulfonic acid methylester, into a transparent hard mass.

*Example 9*

6 grams of polyglycide crotonate prepared in the manner described in U.S. Patent No. 2,556,075, are dissolved in 30 ml. of methylene chloride and the solution is shaken with sodium hydroxide solution in order to remove tin tetrachloride originating from polymerization. After removal of the solvent by evaporation under vacuum, the residue is taken up in benzene and the solvent is evaporated again under vacuum. Subsequently, the product is mixed with 5 grams of ethyleneimine, allowed to stand at room temperature for 8 days and the excess of ethyleneimine is then removed under vacuum. 1.0 gram of the polyglycide-β-ethyleneiminobutyrate thus obtained is stirred into a paste with 50 milligrams of a mixture of equal parts of benzenesulfonic acid methylester and 2,5-dichlorobenzenesulfonic acid methylester. After a few minutes, a cross-linked insoluble product is formed.

*Example 10*

In 100 parts of an addition product of ethylene imine and a polyester prepared from maleic acid anhydride and butyleneglycol-1,3 in the molecular proportions of 5:6, 30 parts of barite, 30 parts of powdered quartz, 5 parts of kieselguhr, 0.01 part of a yellow and 0.03 part of a brown pigment are incorporated. The composition thus obtained is suitable for permanent fillings in the frontal area of the teeth. By mixing said composition with 5% of benzene- or toluene-sulfonic acid methylester, it is converted in a few minutes into a mass of excellent hardness and high transparency.

*Example 11*

0.5 gram of the ethyleneiminopolyester described in the above Example 1, are mixed with 0.1 gram hexanediol-2,5-bis-β-ethyleneiminobutyrate. The resulting mixture has a low viscosity and is, after being mixed with benzenesulfonic acid methylester, very well suitable for fastening inlays and crowns.

Example 12

In 0.5 gram of hexanediol-2,5-bis-β-ethyleneiminobutyrate, 2.2 grams of a mixture of equal parts of powdered quartz and barite are incorporated. The resulting mixture is mixed with 5% by weight of equal parts of benzenesulfonic acid methylester and p-toluenesulfonic acid methylester and yields a composition which becomes hard and insoluble within a few minutes.

Example 13

Instead of the polyester used in Example 10, a polyester prepared from maleic acid anhydride, butyleneglycol-1,3 and hexanediol-1,6 in the molecular ratio of 7:4:4, is used. Further processing is carried out in the manner described in Example 10. Thereby, likewise a very hard and transparent mass results.

Example 14

In 5 parts of an addition product of ethyleneimine with a polyester prepared from maleic acid anhydride, crotonic acid, butyleneglycol-1,3 and hexanediol-1,6, in the molecular proportion of 7:1:5:3, 12 parts of asbestos flour are incorporated. The mass is very satisfactory for permanent fillings in the area of molar teeth.

Example 15

In a product prepared by addition reaction from α,β-ethyleneimine with a polyester prepared from maleic acid anhydride, butyleneglycol-1,3, hexanediol-1,6, 2-ethyl-hexanediol-1,3, in the molecular proportions of 5:2:2:2, 80% of a commercial acrylic resin are incorporated. The resulting mixture has a favorable consistency for being processed and is, after being cross-linked by means of benzenesulfonic acid methylester, of good transparency.

Example 16

A mixture is prepared by kneading 100 grams of an addition product of α,β-ethyleneimine with a polyester prepared from maleic acid anhydride, butyleneglycol-1,3, hexanediol-1,6 and 2-ethyl-2-butyl-propanediol-1,3, in the molecular proportion of 5:3:2:1 and 55 grams of polyvinyl alcohol-formaldehyde-acetal. For hardening, the resulting product is stirred into a paste with 5% by weight of a mixture of equal parts of benzenesulfonic acid methylester, and methanesulfonic acid methylester and the product obtained is used for permanent fillings.

Example 17

Instead of the polyester described in the above Example 16, a polyester prepared from maleic acid anhydride, 2,2-diethylpropanediol-1,3 and butyleneglycol-1,3, in the molecular proportion of 6:2:5, is used. Further processing takes place in the manner described in Example 16. A very hard mass is obtained.

The linear polyesters described above, may contain, instead of the diols mentioned in the above examples, among others also the following diol components:

2-methyl-2, propyl-propanediol-1,3
2,2-dimethyl-propanediol-1,3
propanediol-1,3.

These diols can be, of course, used also in mixtures with other diols.

For adjustment of the molecular weight, small amounts of monovalent alcohols, such as butanol and hexanol, can be used concurrently with the other ingredients.

Instead of maleic acid, in the preparation of polyester resins, other α,β-unsaturated dicarboxylic acids, e.g. fumaric acid can be also used.

As cross-linking agents, instead of the above described examples of cross-linking agents, other alkylation agents can be likewise used, for example o-Toluenesulfonic acid methylester, if desired in mixture with p-toluenesulfonic acid methylester,
Benzenesulfonic acid-allylester,
p-Methoxy-benzenesulfonic acid methylester,
Ethanesulfonic acid methylester.

If the respective substances are solid at ordinary room temperatures, e.g. 15°–25° C., they are preferably used in mixture with liquid cross-linking agents.

The compositions described in the above examples have been found very advantageous for filling cavities in the teeth, as well as base fillings and the like.

It will be understood from the above that this invention is not limited to the specific materials, steps, proportions and other details specifically described above and can be carried out with various modifications without departing from the scope of the invention, as defined in the appended claims.

The parts and percent mentioned herein are by weight if not otherwise stated.

The composition for filling dental cavities is to contain from 10 to 100 percent, preferably from 30 to 90 percent by weight, of the polyethylene imine compounds capable of cross-linking. The residue are customary fillers, pigments, glass fibers and the like.

Especially suited are addition-products of alpha-beta-ethyleneimines or their C-alkyl derivatives and polyesters of alpha-beta-unsaturated carboxylic acids and polyhydric alcohols, and in which ethyleneimines or one of their C-alkyl derivatives are added on at least 40 percent, preferably from 70 to 100 percent, of the unsaturated carbon-to-carbon-bonds of the polyester.

In the unsaturated polyester component on which ethyleneimines have been added, up to 50 percent of the unsaturated carboxylic acids may be substituted by saturated carboxylic acids. In this connection it is essential, however that alpha-beta-ethyleneimines or one of their C-alkyl derivatives have been added on virtually all double bonds of the unsaturated carboxylic acids.

As mentioned above, in the reaction products of polyepihalogenohydrine with ethyleneimines or their C-alkyl derivatives up to 50 percent of the halogen atoms may be substituted by alkoxy or aryloxy groups. It is noteworthy that, generally speaking, setting by the cross-linking agents occurs the more slowly the lower is the percentage of ethyleneimine groups present in the molecule.

What is claimed is:

1. In the filling of dental cavities and the fastening of substitute tooth members within the mouth, by application of cement to, respectively, the cavities and the surfaces to be joined, the steps of providing in place as, respectively, filling and fastener, a cementing composition comprising an admixture of polyethyleneimine compound containing in the molecule at least 2 and up to an average of 20 ethyleneimine groups whereby the compound is amenable to cross-linking, and a cross-linking agent selected from the group consisting of alkyl and aryl sulfonic acid esters for the polyethyleneimine compound, and allowing cross-linking to occur whereby, respectively, the filling and fastening is effected.

2. The method of claim 1, the polyethyleneimine compound being a reaction product of a compound selected from the group consisting of α,β-ethyleneimine and alkyl substituted α,β-ethyleneimines, with a reactant selected from the group consisting of polyepihalogenohydrine and polyester of an α,β-unsaturated carboxylic acid and a polyhydric alcohol.

3. The method of claim 2, in which the polyethyleneimine compound is the reaction product of α,β-ethyleneimine with polyepihalogenohydrine.

4. The method of claim 2, in which the polyethyleneimine compound is the addition product of α,β-ethyleneimine with a polyester of an α,β-unsaturated carboxylic acid with a polyhydric alcohol.

5. The method of claim 1 wherein the cross-linking agent comprises at least one alkylating cross-linking agent.

6. The method of claim 1 in which the polyethyleneimine compound consists of the addition product of α,β- ethyleneimine with a polyester of α,β-unsaturated dicarboxylic acid with a dihydric alcohol.

7. The method of claim 1 in which the polyethyleneimine compound is the addition product of a compound selected from the group consisting of α,β-ethyleneimine and alkyl-substituted α,β-ethyleneimines, with a polyester of an α,β-unsaturated dicarboxylic acid with a dihydric alcohol, the hydroxyl groups of which are linked to non-vicinal carbon atoms.

8. The method of claim 1 in which the polyethyleneimine compound is the addition product of a compound selected from the group consisting of α,β-ethyleneimine and alkyl-substituted α,β-ethyleneimines, with a polyester of an α,β-unsaturated dicarboxylic acid with a branched dihydric alcohol.

9. The method of claim 7 in which the polyethyleneimine is the addition product of a compound selected from the group consisting of α,β-ethyleneimine and alkyl-substituted α,β-ethyleneimines with a polyester which is the reaction product of an α,β-unsaturated dicarboxylic acid with a mixture of dihydric alcohols.

10. The method of claim 9 in which the α,β-unsaturated dicarboxylic acid is maleic acid.

11. The method of claim 1 in which the polyethyleneimine compound contains 2–10 ethyleneimine radicals, on the average.

12. The method of claim 1 in which the polyethyleneimine compound contains 3–7 ethyleneimine radicals, on the average.

13. The method of claim 2 in which the addition product contains an α,β-ethyleneimine compound selected from the group consisting of α,β-ethyleneimine and alkyl-substituted α,β-ethyleneimines and in the polyester, the α,β-unsaturated dicarboxylic acids are partly substituted by carboxylic acids selected from the group consisting of α,β-unsaturated monocarboxylic acids, saturated monocarboxylic acids and saturated dicarboxylic acids.

14. The method of claim 2 in which the addition produce is of an α,β-ethyleneimine compound selected from the group consisting of α,β-ethyleneimine and alkyl-substituted α,β-ethyleneimines and the polyester is of the acid, dihydric alcohol and monohydric alcohol.

15. The method of claim 3 in which in the reaction product of α,β-ethyleneimine with polyepihalogeno-hydrine part of the halogen atoms are substituted by ethyleneimino radicals and the rest of the halogen atoms are substituted by radicals selected from the group consisting of alkoxy and aryloxy groups.

16. The method of claim 5 in which the cross-linking agent is an aryl sulfonic acid methylester.

17. The method according to claim 16 in which the cross-linking agent is 2,5-dichloro-benzene sulfonic acid methylester.

18. The method of claim 1 in which the composition comprises an amine in an amount sufficient to neutralize the polyethyleneimine compound.

19. The method according to claim 18 in which the amine is selected from the group consisting of difficultly volatile and non-volatile tertiary monoamines and tertiary polyamines.

20. The method according to claim 1, where the composition contains filling material in admixture therewith.

21. The method of claim 20, wherein the composition comprises organic filling materials.

22. The method of claim 21 in which the organic filling material is an acetal of polyvinylalcohol.

23. The method of claim 22 in which the organic filling material is polyvinyl alcohol-formaldehyde-acetal.

24. The method of claim 21 in which the polyethyleneimine compound is admixed with hexanediol-2,5-bis-beta-ethyleneiminobutyrate.

25. The method according to claim 16 in which the cross-linking agent is 4-nitro-benezene sulfonic acid methyl ester.

References Cited in the file of this patent

UNITED STATES PATENTS

| | | |
|---|---|---|
| 2,163,807 | Piggott et al. | June 27, 1939 |
| 2,296,225 | Ulrich | Sept. 15, 1942 |
| 2,626,931 | Bestian | Jan. 27, 1953 |
| 2,677,681 | Gill | May 4, 1954 |
| 2,745,817 | Logeman et al. | May 15, 1956 |
| 2,758,106 | Bredereck et al. | Aug. 7, 1956 |

FOREIGN PATENTS

| | | |
|---|---|---|
| 488,553 | Great Britain | July 8, 1938 |
| 764,313 | Great Britain | Dec. 28, 1956 |
| 851,852 | Germany | Oct. 9, 1952 |